(12) United States Patent
Eom et al.

(10) Patent No.: US 7,184,389 B2
(45) Date of Patent: Feb. 27, 2007

(54) RECORDING MEDIUM STORING LINK INFORMATION AND APPARATUS AND METHOD FOR LINKING DATA

(75) Inventors: Woo-sik Eom, Gyeonggi-do (KR); Joong-eon Seo, Gyeonggi-do (KR); Kyung-geun Lee, Gyeonggi-do (KR); Yoon-woo Lee, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 467 days.

(21) Appl. No.: 09/976,277

(22) Filed: Oct. 15, 2001

(65) Prior Publication Data

US 2002/0067679 A1 Jun. 6, 2002

(30) Foreign Application Priority Data

Nov. 20, 2000 (KR) .............................. 2000-69018

(51) Int. Cl.
*G11B 7/00* (2006.01)
(52) U.S. Cl. .................... 369/275.3; 369/59.25
(58) Field of Classification Search .......... 369/59.25, 369/275.3
See application file for complete search history.

(56) References Cited

U.S. PATENT DOCUMENTS

| | | | | |
|---|---|---|---|---|
| 5,408,478 A | * | 4/1995 | Ohmori et al. | 714/756 |
| 5,805,547 A | * | 9/1998 | Yamamuro | 369/53.21 |
| 6,252,838 B1 | * | 6/2001 | Kuroda et al. | 369/47.28 |
| 6,442,128 B1 | * | 8/2002 | Lee et al. | 369/275.1 |
| 6,477,127 B1 | * | 11/2002 | Osada et al. | 369/47.28 |
| 6,538,964 B1 | * | 3/2003 | Hashimoto | 369/47.22 |
| 6,560,181 B1 | * | 5/2003 | Takahashi | 369/53.35 |

FOREIGN PATENT DOCUMENTS

| | | | |
|---|---|---|---|
| EP | 1052639 A2 | * | 11/2000 |
| EP | 1067545 A2 | * | 1/2001 |
| JP | 09-270171 | | 10/1997 |
| JP | 2000-137948 | | 5/2000 |
| JP | 2000-187965 | | 7/2000 |
| JP | 2000215607 A | * | 8/2000 |
| JP | 2000-251255 | | 9/2000 |

OTHER PUBLICATIONS

Machine Translation of Ueki (JP 2000-137948).*
U.S. Appl. No. 11/333,318, filed Jan. 18, 2006, Eom et al.
Japanese Office Action issued on May 14, 2004 in the corresponding Japanese Application 2001-315900.

* cited by examiner

*Primary Examiner*—Andrea Wellington
*Assistant Examiner*—Peter Vincent Agustin
(74) *Attorney, Agent, or Firm*—Staas & Halsey LLP

(57) ABSTRACT

An optical recording medium storing information for regarding data in the current sector as data in a linking loss area, and an apparatus and method providing linking data. The data link method includes dividing an error correction code block having a predetermined size into a plurality of sectors and checking data type identification information which indicates whether or not data in each sector is linking data; and replacing main data of a sector with predetermined data according to the result of checking the data type identification information. According to the above method, data type information is checked to determine whether or not to replace main data of the current sector with dummy data. By doing so, error occurrence of the prior art can be prevented and block error correction is carried out more effectively.

16 Claims, 5 Drawing Sheets

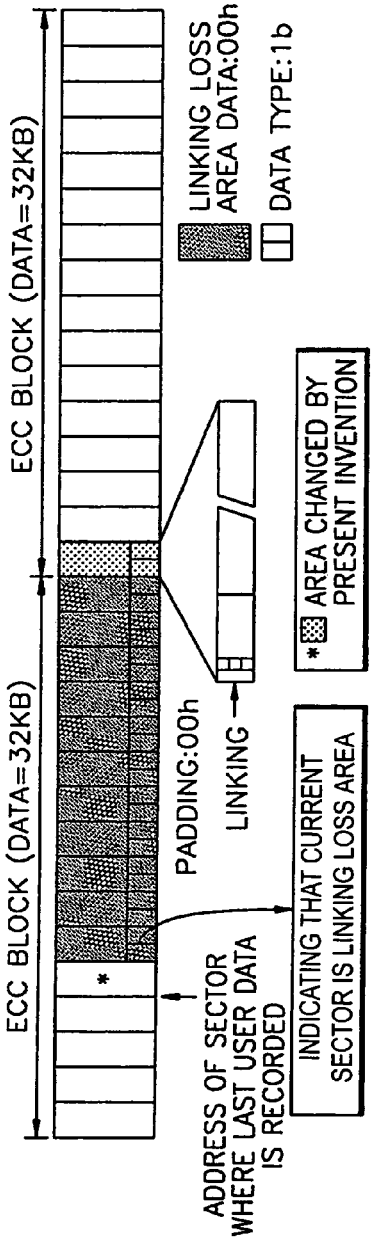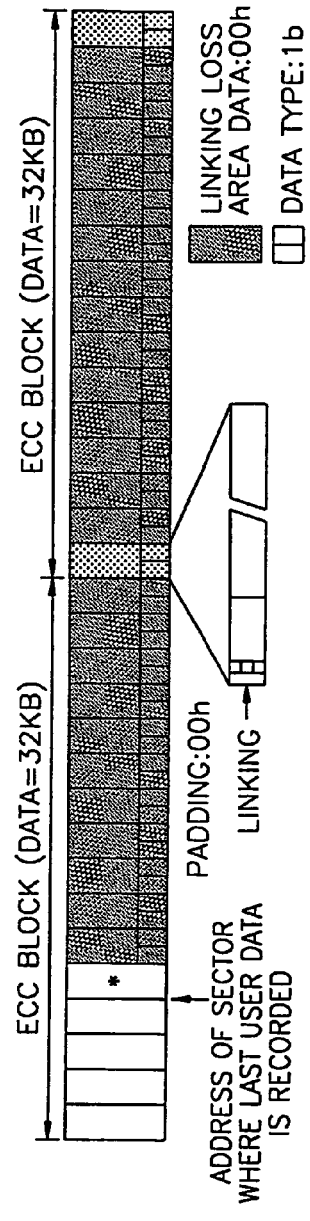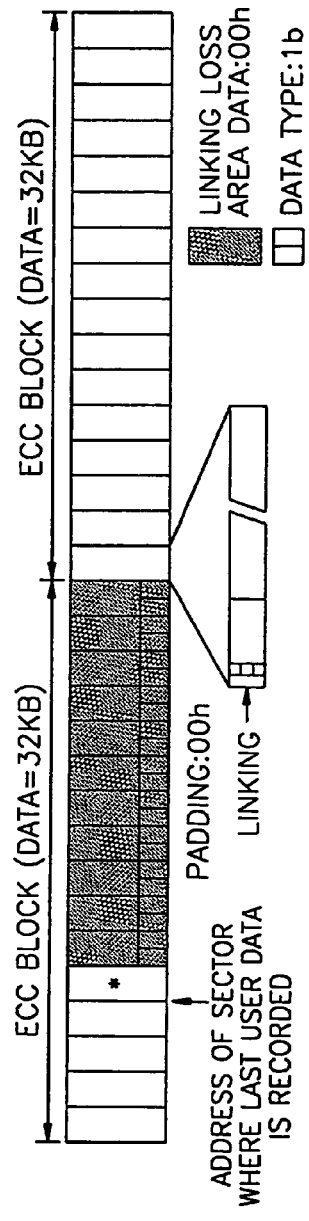

RECORDING MEDIUM STORING LINK INFORMATION AND APPARATUS AND METHOD FOR LINKING DATA

CROSS-REFERENCE TO RELATED APPLICATIONS

This application claims the benefit of Korean Patent Application No. 2000-69018 filed on Nov. 20, 2000, in the Korean Industrial Property Office, the disclosure of which is incorporated herein by reference.

BACKGROUND OF THE INVENTION

1. Field of the Invention

The present invention relates to an optical recording medium and a reproducing apparatus and method, and more particularly, to a recording medium storing information regarding data in the current sector as data in a linking loss area, and an apparatus and method linking data.

2. Description of the Related Art

Since basic recording units of a digital versatile disc-rewritable (DVD-RW) are positioned one after another in a continuous series, in contrast to those of a DVD-Random Access Memory (DVD-RAM) which are divided by physical identifier (PID) areas or buffer fields (extra areas allocated to correspond to a requirement for controlling a spindle motor accurately), it is required that a recording-start point of each basic recording unit in a DVD-RW is precisely located. Here, the basic recording unit of the DVD-RAM may be a sector and the basic recording unit of the DVD-RW may be an error correction code (ECC) block.

Since the basic recording units of the DVD-R and the DVD-RW, which have the same physical formats, are positioned in a continuous series as described above, when data transmission or recording is momentarily discontinued or subsequently recommenced, the DVD-R and the DVD-RW use a linking scheme in which an extra area of a next recording-start point is allocated. The sizes of a linking area which is applied to the linking scheme are 0 kilo bytes (KB), 2 KB, and 32 KB.

FIGS. 1A through 1C are schematic diagrams showing conventional data linking methods. FIG. 1A shows the data structure of a 2 KB linking method, FIG. 1B shows the data structure of a 32 KB linking method, and FIG. 1C shows the data structure of a 0 KB linking method. In the conventional linking methods as shown, if the data type in sector information is '1b', this indicates that the next sector is a linking loss area. The linking loss area has no effective data and only stores dummy data, that is, '00h'. Therefore, main data recorded in a subsequent area is replaced with '00h' regardless of reproducing data, and therefore correction of an ECC block can be improved.

FIG. 1A shows a data structure in which the size of a linking loss area is 2 KB, and FIG. 1B shows a data structure in which the size of a linking loss area is 32 KB. If user data does not fill an entire first ECC block, padding data is recorded in the remaining part of the first ECC block. If the data type of the last sector of the first ECC block is '1b', the first sector (2 KB) of the second ECC block or an entire second ECC block (16 sectors=32 KB) becomes a linking loss area according to a linking type and padding data is recorded in the linking loss area.

FIG. 1C shows a data structure, in which 0 KB linking is performed after performing 32 KB linking. That is, FIG. 1C shows 0 KB link recording in the second ECC block (the 32 KB linking loss area) of FIG. 1B, and user data is recorded from the first sector of the second ECC block in which 0 KB linking is performed. However, if the data type is '1b' in the last recording sector of the first ECC block of FIG. 1C, the next sector, that is, the first sector of the second ECC block, may be taken for a linking loss area and user data can be replaced with '00h'. Therefore, an error may occur in this sector, and as a result an ECC error occurs in the entire second ECC block and data in the second ECC block cannot be reproduced.

SUMMARY OF THE INVENTION

Accordingly, it is an object of the present invention to provide a recording medium having sectors where data is recorded, in which data in a sector is regarded as data in a linking loss area according to data type information.

It is another object of the present invention to provide a method of linking data, depending on effectiveness of data in a sector, which is determined by using data type information.

It is yet another object of the present invention to provide an apparatus linking data, depending on effectiveness of data in a sector, which is determined by using data type information.

Additional objects and advantages of the invention will be set forth in part in the description which follows and, in part, will be obvious from the description, or may be learned by practice of the invention.

The foregoing and other objects of the present invention are achieved by providing a recording medium having sectors where data is recorded, in which each sector has a data identification area, in which information identifying the type of data recorded in the sector is recorded, and the data identification area indicates at least whether or not data recorded in the sector is linking data.

The above and other objects of the present invention may also be achieved by providing a method of linking data, the method having the operations of (a) dividing an error correction code block having a predetermined size into a plurality of sectors and checking data type identification information which indicates whether or not data in each sector is linking data; and (b) replacing main data of a sector with predetermined data according to the result of checking the data type identification information.

The above and other objects of the present invention may also be achieved by providing an apparatus linking data in a process recording and/or reproducing optical data, the apparatus having a checking unit checking and outputting the type of data if no error occurs in an error correction code block having a plurality of sectors, each sector having data type identification information which indicates that data recorded in the sector is linking data; and a replacing unit that replaces main data of a sector with predetermined data according to the data type output from the checking means.

BRIEF DESCRIPTION OF THE DRAWINGS

These and other objects and advantages of the present invention will become more apparent and more readily appreciated from the following description of the embodiments, taken in conjunction with the accompanying drawings of which:

FIGS. 5A, 5B, and 5C are schematic diagrams of a data structure explaining a data linking method according to the present invention.

DETAILED DESCRIPTION OF THE PREFERRED EMBODIMENTS

Figure 1:
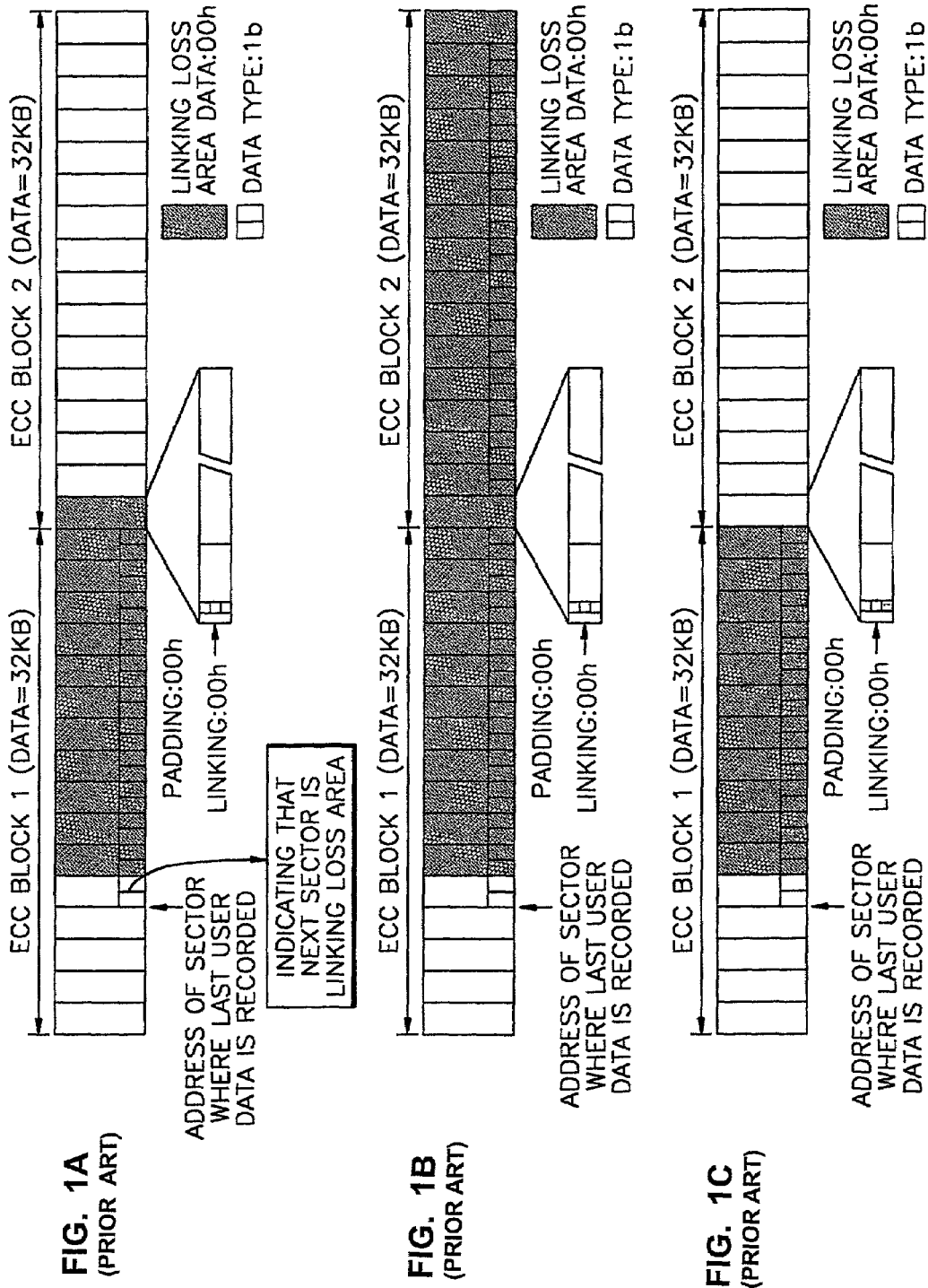
FIGS. 1A, 1B, and 1C are schematic diagrams of the data structure in a conventional data linking method.

Reference will now be made in detail to the embodiments of the present invention, examples of which are illustrated in the accompanying drawings, wherein like reference numerals refer to the like elements throughout. The embodiments are described below in order to explain the present invention by referring to the figures.

Figure 2:
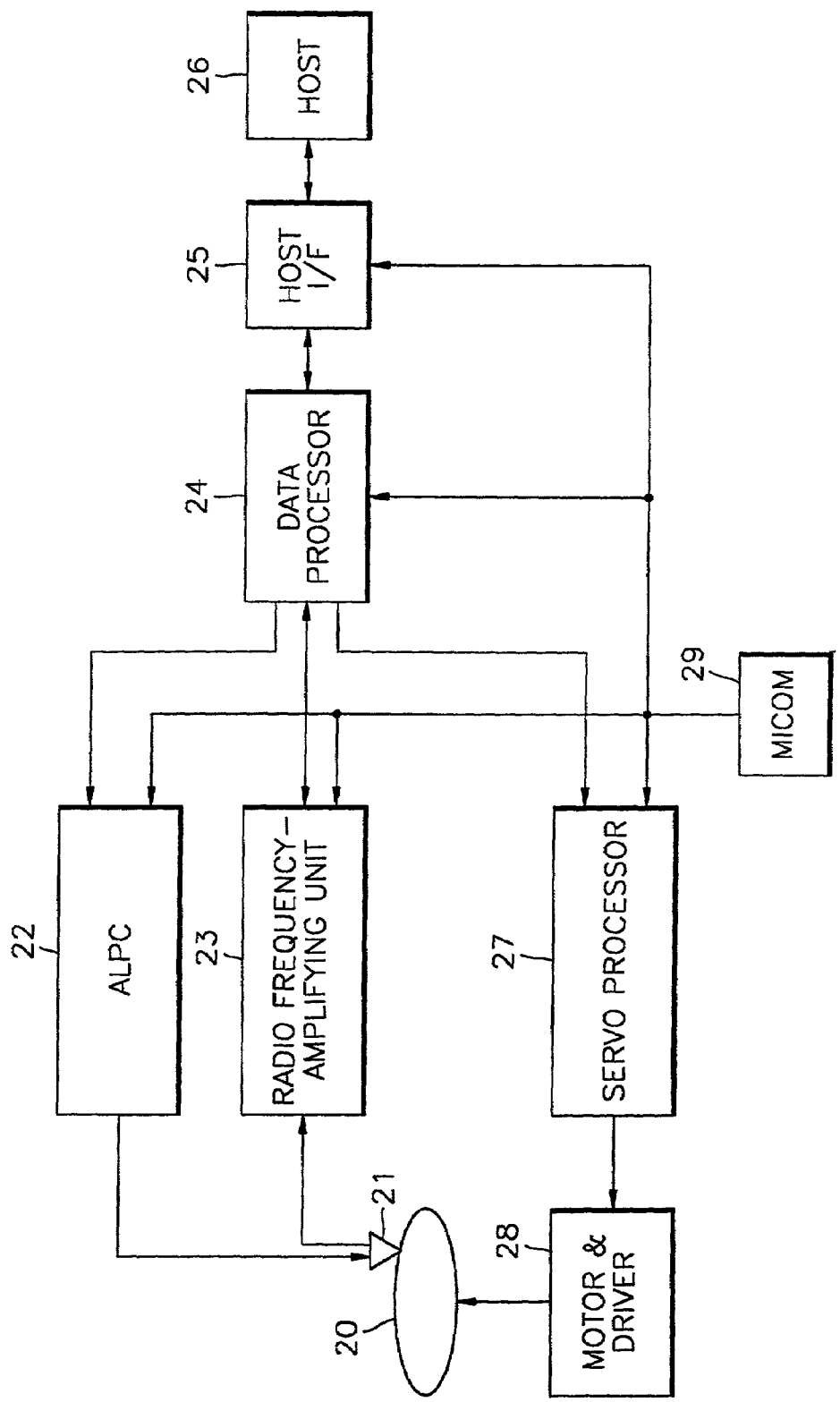
FIG. 2 is a block diagram of a digital versatile disc-recordable/rewritable (DVD-R/RW) apparatus.

The DVD-R/RW apparatus shown in FIG. 2 has a disc 20, a pickup 21, an auto laser power control (ALPC) 22, a radio frequency-amplifying unit 23, a data processor 24, a host interface 25, a host 26, a servo processor 27, a motor and driver 28, and a microcomputer (MICOM) 29.

The ALPC 22 controls the power of a laser beam emitted from the pickup 21, and the radio frequency-amplifying unit 23 amplifies a minute signal picked up from the disc 20. The data processor 24 processes link data in accordance with data types, performs detection, insertion, protection, modulation and demodulation of a synchronization signal, and generates various control signals for error correction and for controlling the radio frequency-amplifying unit 23. The host interface 25 connects the optical recording apparatus with a host 26. The servo processor 27 controls various motors and servos related to the disc 20 to perform tracking and focusing, etc. The motor and driver 28 performs a function of rotating the disc 20 and driving motors, and the MICOM 29 controls the overall operation of the optical recording apparatus.

Figure 3:
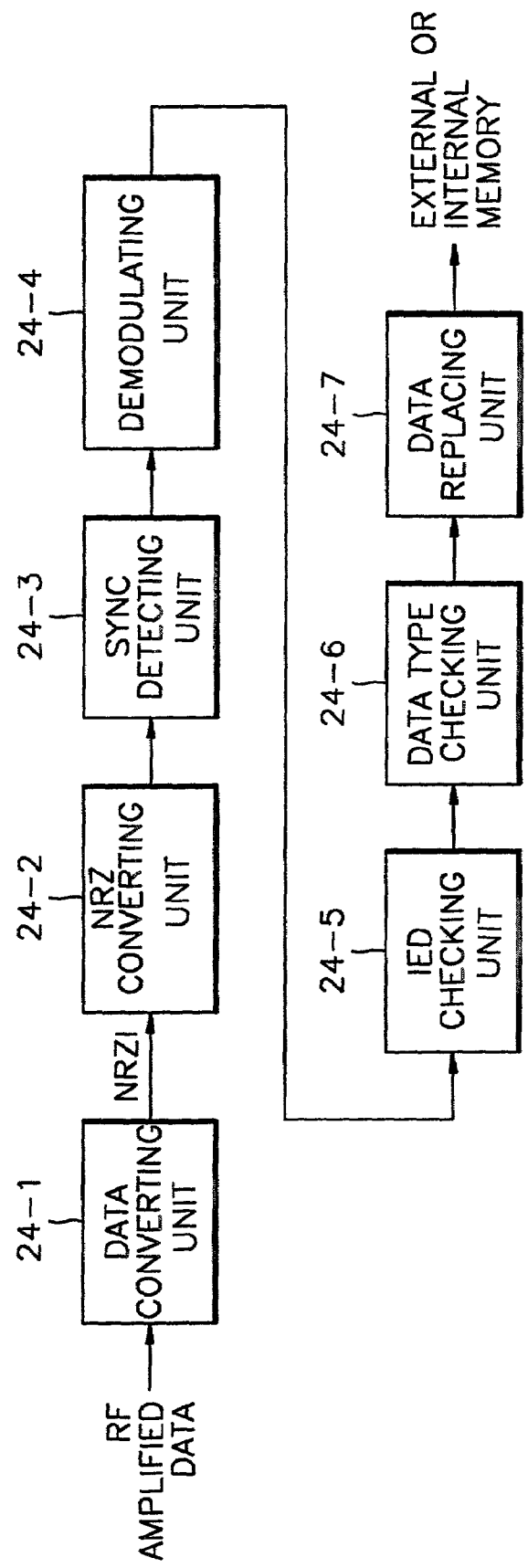
FIG. 3 is a block diagram of the configuration of an apparatus providing linking data according to the present invention.

FIG. 3 is a block diagram of the configuration of an apparatus linking data according to the present invention, and is a detailed diagram of the data processor 24 shown in FIG. 2. The data processor 24 of FIG. 3 has a data converting unit 24-1, a non-return-to-zero (NRZ) converting unit 24-2, a sync detecting unit 24-3, a demodulating unit 24-4, an identification error detection (IED) checking unit 24-5, a data type checking unit 24-6, and a data replacing unit 24-7.

The data converting unit 24-1 converts an analog signal, which is amplified and output by the radio frequency-amplifying unit 23, into non-return-to-zero inversion (NRZI)-type digital data. The NRZ converting unit 24-2 converts NRZI-type data, which is output from the data converting unit 24-1, into NRZ-type data. The sync detecting unit 24-3 performs detection, protection, and insertion of various synchronization signals contained in NRZ data. The demodulating unit 24-4 demodulates the modulated 16-channel bits into 8 bits. The IED checking unit 24-5 checks whether or not an error exists in a data identification area in the demodulated data.

If the IED checking unit 24-5 indicates that there is no error in the data identification area, the data type checking unit 24-6 checks data type information in the data identification area.

Figure 4:
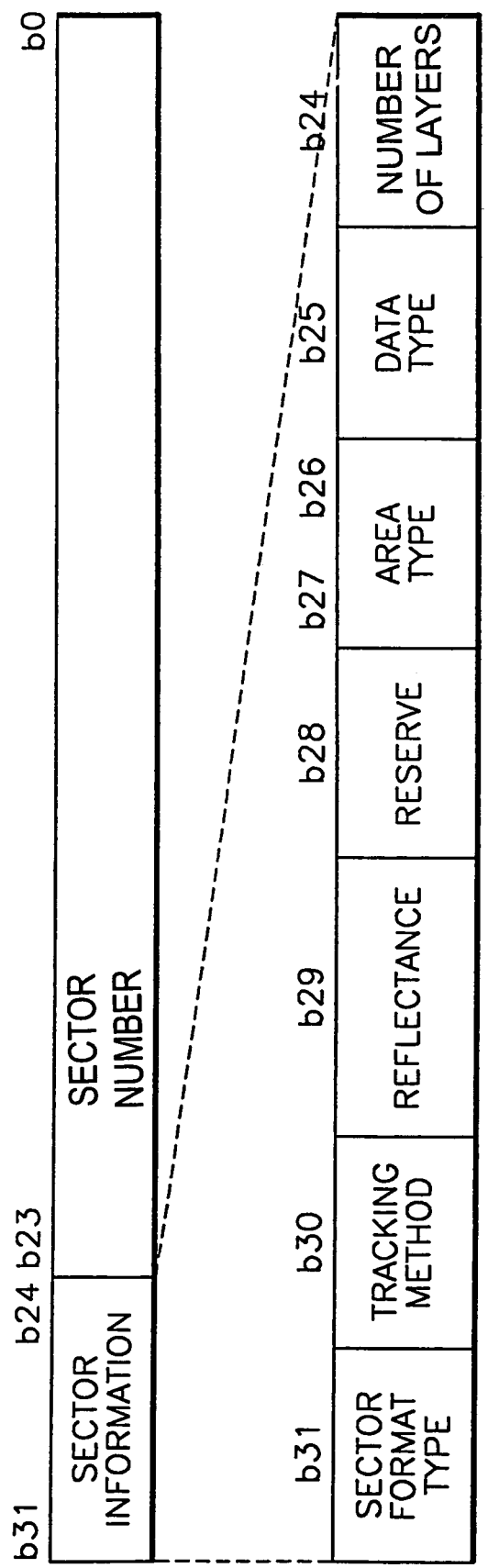
FIG. 4 is a schematic diagram showing the data structure of a data identification area, in which data type information is stored, according to the present invention.

FIG. 4 is a schematic diagram showing the data structure of a data identification area, in which data type information is stored, according to the present invention. The data identification area is formed with a sector information field and a sector number field. The sector information field is formed of a sector format type field, a tracking method field, a reflectance field, a reserve field, an area type field, a data type field and a number-of-layers field.

That is, sector format type information of bit position b31 indicates a constant linear velocity (CLV) or zone constant linear velocity (ZCLV) as follows:

0b: CLV format type
1b: Zoned format type, specified for Rewritable discs

Tracking method information of bit position b30 indicates pit tracking or groove tracking as follows:

0b: Pit tracking
1b: Groove tracking, specified for Rewritable discs

Reflectance information of bit position b29 indicates whether or not reflectance exceeds 40% as follows:

0b: Reflectance is greater than 40%
1b: Reflectance is less than or equal to 40%.

Bit position b28 indicates a reserve bit.

Area type information of bit positions b27 and b26 indicates a data area, a lead-in area, a lead-out area, or a middle area for a read-only disc as follows:

00b: Data area
01b: Lead-in area
10b: Lead-out area
11b: Middle area of read-only discs Data type information of bit position b25 indicates read-only data, or the linking data as follows:

0b: Read-only data
1b: Linking data

Layer number information of bit position b24 indicates the number of layers in a single layer disc or a dual layer disc as follows:

0b: Layer 0 of dual layer disc or single layer disc
1b: Layer 1 of dual layer disc A data identification area for storing data type information, as shown in FIG. 4, is recorded on a recording medium, such as an optical disc 20.

If data type information in bit position b25 of FIG. 4 is '1b', the data replacing unit 24-7 replaces main data in the corresponding sector, that is, the current sector, with '00h' and outputs '00h' to an external or internal memory (not shown).

FIGS. 5A, 5B, and 5C are schematic diagrams of a data structure explaining a data linking method according to the present invention, showing a 2 KB link method, a 32 KB link method and a 0 KB link method, respectively.

In the linking method of the present invention, shown in FIGS. 5A, 5B, and 5C, if the data type contained in sector information is '1b', this indicates that the current sector is a linking loss area. A linking loss area has no effective data and only dummy data is recorded in the linking loss area. Therefore, main data recorded in the current sector is replaced with '00h' regardless of data to be reproduced, and correction of an ECC block can be improved.

FIG. 5A is a data structure in which the size of a linking loss area is 2 KB (1 sector), and FIG. 5B is a data structure in which the size of a linking loss area is 32 KB (16 sectors). If user data does not fill the entire first ECC block, padding data is recorded in the remaining part of the first ECC block. In the prior art, if the data type is '1b', the next sector is allocated as a linking loss area. However, in the present invention, the current sector is allocated as a linking loss area, and therefore the sector marked by '*', in which the last user data is recorded, has no meaning in the present invention. If the data type of the current sector of the second ECC block is '1b', the current sector is allocated as a linking loss area and main data in the current sector is replaced with dummy data '00h'.

FIG. 5C shows a data structure in which 0 KB linking is performed after performing 32 KB linking. That is, FIG. 5C shows 0 KB link recording in the second ECC block (the 32 KB linking loss ) of FIG. 5B, and user data as main data is recorded in the first sector in which 0 KB linking is performed. Also in FIG. 5C, if the user does not fill the entire first ECC block, padding data is recorded in the remaining part of the first ECC block. In the prior art, if the data type is '1b', the next sector is allocated as a linking loss area. However, in the present invention, the current sector is allocated as a linking loss area, and therefore the sector marked by '*', in which the last user data is recorded, has no meaning in the present invention. In addition, even if user data is recorded as 0 KB in the second ECC block, which is linked by 32 KB, the data type in the current sector is checked and the current sector can be allocated as a linking loss area. Therefore, the problem of error occurrence is solved. That is, since the data type of the current sector is '0b', main data is determined as user data and is not replaced with dummy data '00h'.

According to the method of the present invention, data type information is checked to determine whether or not to replace main data of the current sector with dummy data. By doing so, error occurrence of the prior art can be prevented and block error correction is more effectively carried out.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A recording medium having sectors where data is recorded, wherein:
   each sector has a data identification area, in which information identifying the type of data recorded in the sector is recorded, and the data identification area indicates whether the data recorded in the sector is linking data; and
   each sector has a main data area, and dummy data is recorded in the main area of the sector in which the information recorded in the data identification area indicates that the recorded data is linking data.

2. The recording medium of claim 1, wherein 0 kilobytes (KB) are assigned to a dummy data area of the sector by linking after 32 kilobytes (KB) are assigned to a dummy data area of the sector by linking.

3. The recording medium of claim 1, wherein 2 KB are assigned to a dummy data area of the sector by linking.

4. The recording medium of claim 1, wherein 32 KB are assigned to a dummy data area of the sector by linking.

5. An apparatus linking data in a process recording and/or reproducing optical data, the apparatus comprising:
   a checking unit checking and outputting the type of data if no error occurs in an error correction code block having a plurality of sectors, each sector having data type identification information which indicates whether data recorded in the sector is linking data; and
   a replacing unit replacing main data of at least one of the plurality of sectors with predetermined data according to the data type output from the checking unit.

6. The apparatus of claim 5, wherein if the linking data is recorded in the sector, the replacing unit replaces the main data of the sector with dummy data.

7. The recording medium according to claim 1, wherein said data type identification information area comprises a sector information field and a sector number field.

8. The recording medium according to claim 7, wherein said sector information field comprises a sector format type field, a tracking method field, a reflectance field, a reserve field, an area type field, a data type field and a number-of-layers field.

9. The recording medium according to claim 8, wherein the sector format type information indicates a constant linear velocity (CLV) or zone constant linear velocity (ZCLV) as follows:
   a first type of bit indicates CLV format type; and
   a second type of bit indicates ZCLV format type, specified for rewritable discs.

10. The recording medium according to claim 8, wherein the tracking method information indicates pit tracking or groove tracking as follows:
    a first type of bit indicates pit tracking; and
    a second type of bit indicates groove tracking, specified for rewritable discs.

11. The recording medium according to claim 8, wherein the reflectance information indicates whether or not reflectance exceeds 40% as follows:
    a first type of bit indicates reflectance is greater than 40%; and
    a second type of bit indicates reflectance is less than or equal to 40%.

12. The recording medium according to claim 8, wherein the reserve information indicates a reserve bit.

13. The recording medium according to claim 8, wherein the area type information indicates a data area, a lead-in area, a lead-out area, or a middle area for a read-only disc as follows:
    00b indicates data area;
    01b indicates lead-in area;
    10b indicates lead-out area; and
    11b indicates a middle area of a read-only disc.

14. The recording medium according to claim 8, wherein the data type information indicates read-only area, or the linking data as follows:
    a first type of bit indicates a read-only area; and
    a second type of bit indicates a linking area.

15. The recording medium according to claim 8, wherein the layer number information indicates the number of layers in a single layer disc or a dual layer disc as follows:
    a first type of bit indicates layer 0 of a dual layer disc or a single layer disc; and
    a second type of bit indicates layer 1 of a dual layer disc.

16. A recording unit linking data in a process recording optical data, the recording unit comprising:
    a checking unit checking and outputting the type of data if no error occurs in an error correction code block having a plurality of sectors, each sector having data type identification information which indicates whether data recorded in the sector is linking data; and
    a replacing unit replacing main data of at least one of the sectors with predetermined data according to the data type output from the checking unit.

* * * * *

UNITED STATES PATENT AND TRADEMARK OFFICE
CERTIFICATE OF CORRECTION

| | | |
|---|---|---|
| PATENT NO. | : 7,184,389 B2 | Page 1 of 2 |
| APPLICATION NO. | : 09/976277 | |
| DATED | : February 27, 2007 | |
| INVENTOR(S) | : Woo-sik Eom et al. | |

It is certified that error appears in the above-identified patent and that said Letters Patent is hereby corrected as shown below:

Column 5, Line 38, change "sector" to --respective one of the sectors--.

Column 5, Line 40, before "sector" insert --respective--.

Column 5, Line 41, after "recorded in" change "the" to --that--.

Column 5, Line 43, change "sector" to --respective one of the sectors--.

Column 5, Line 59, change "sector" to --respective one of the sectors--.

Column 5, Line 61, change "the" to --that--.

Column 6, Line 5, after "data" delete "type".

Column 6, Line 13, before "the sector" insert --information of--.

Column 6, Line 13, change "information" to --field--.

Column 6, Line 20, before "the tracking" insert --information of--.

Column 6, Line 20, change "information" to --field--.

Column 6, Line 26, before "the reflectance" to --information of--.

Column 6, Line 26, change "information" to --field--.

Column 6, Line 33, change "the reserve information" to --information of the reserve field--.

Column 6, Line 35, change "the area type information" to --information of the area type field--.

Column 6, Line 43, change "the data type information" to --information of the data type field--.

Column 6, Line 48, change "the layer number information" to --information of the number-of-layers field--.

Column 6, Line 57, change "sector" to --respective one of the sectors--.

UNITED STATES PATENT AND TRADEMARK OFFICE
CERTIFICATE OF CORRECTION

PATENT NO. : 7,184,389 B2
APPLICATION NO. : 09/976277
DATED : February 27, 2007
INVENTOR(S) : Woo-sik Eom et al.

It is certified that error appears in the above-identified patent and that said Letters Patent is hereby corrected as shown below:

Column 6, Line 59, change "the" to --that--.

Signed and Sealed this

Third Day of July, 2007

JON W. DUDAS
*Director of the United States Patent and Trademark Office*